May 6, 1969
B. FORAS
3,442,065
APPARATUS FOR ELIMINATING VOLATILE CONSTITUENTS IN VARIOUS COMPOSITIONS
Filed May 1, 1967
Sheet 1 of 2
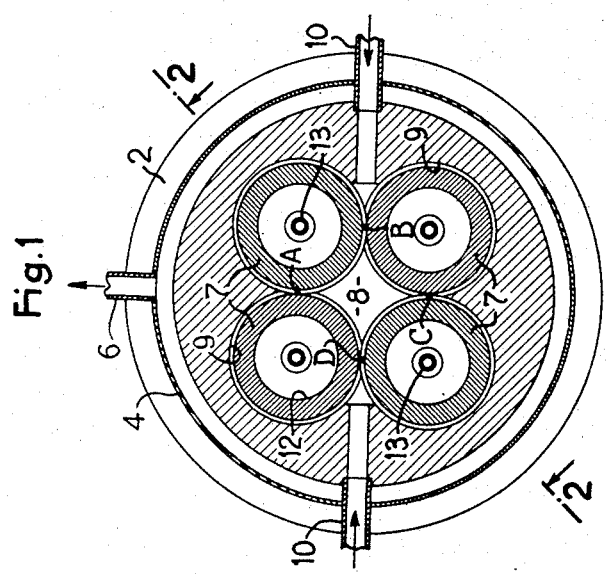
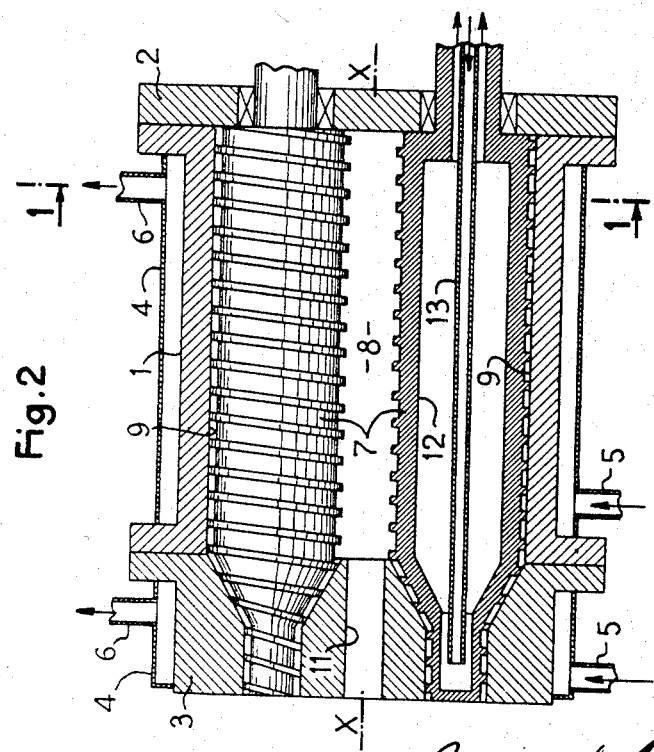

United States Patent Office 3,442,065
Patented May 6, 1969

3,442,065
APPARATUS FOR ELIMINATING VOLATILE CONSTITUENTS IN VARIOUS COMPOSITIONS
Bernard Foras, Lyon, France, assignor to Plastugil, Lyon, France, a French body corporate
Filed May 1, 1967, Ser. No. 634,932
Claims priority, application France, May 6, 1966, 60,511
Int. Cl. B01d 19/00
U.S. Cl. 55—191                                    5 Claims

ABSTRACT OF THE DISCLOSURE

An apparatus for eliminating very high contents of volatile constituents from a composition without risk of pollution of the composition, said apparatus comprising an elongated enclosure which is provided with a devolatilization chamber and in which are rotatably mounted cylinders having parallel axes, each of said cylinders being tangent to two other cylinders, an operational clearance being provided, said cylinders completely surrounding the devolatilization chamber, the longitudinal walls of the chamber being constituted by that part of the lateral surface of each cylinder which is located between the two generatrices on which the cylinder is tangent to two other cylinders and faces the axis of the enclosure.

---

The present invention relates to apparatuses for eliminating volatile ingredients from compositions which are in a thick liquid or pasty form, these ingredients consisting for example of plastc, elastic or very viscous materials.

It concerns more particularly, without, however, being limited thereby, apparatuses of this type which are adapted to eliminate the monomers, additives or impurities contained in polymer compositions issuing from the polymerization stage, these apparatuses being commonly known as devolatilizers.

Presently-known devolatilizers consist of a heated enclosure in which rotate one or more screws or rollers surmounted by a decompression chamber having a vacuum take-off, the latter enabling the volatile materials to be discharged. These apparatuses are effective but they have a serious drawback. The heavy elements, which condense and accumulate on the fixed wall of the decompression chamber, are superheated and tar or carbonize. The tarry or carbonized deposits thus formed gradually pollute the polymers in course of treatment and colour them in an undesirable manner.

This pollution is the more inconvenient as the percentage of the materials to be eliminated in the polymer is higher. It becomes extremely regrettable in the new processes of polymerization or copolymerization in which the conversion rate is voluntarily limited to values between 40 and 80%; the amount of volatile materials is then extremely great and could correspond to more than one half of the mixture issuing from the polymerization process. These processes are extremely interesting both from the point of view of working and technical conception and from the point of view of the quality of the products obtained, these having a very narrow composition and molecular weight distribution. But this technical interest could be jeopardized by a dangerous pollution of the product obtained in the course of the subsequent devolatilization stage when currently-used devolatilizers are employed.

Various solutions have been proposed to attempt to lessen the drawback of tarry deposits and effect the devolatilization without the danger of pollution. Some suggest heating the devolatilization chamber at a temperature higher than the melting temperature of the composition containing the polymer so as to avoid deposits.

Others have discovered that the coloured deposits are formed to a smaller extent on surfaces of aluminum or an alloy containing this metal.

These solutions cannot completely solve the problem since, in any case, the material to be devolatilized comes in contact with the fixed walls of the devolatilization chamber and both the volatile products and the deposits or projections of polymers have a tendency to stay on these walls and, within time, carbonize or tar. They subsequently fall into the polymer which they pollute dangerously.

A possible way of avoiding this pollution could reside in the elimination of the vault or roof of the devolatilization chamber, the outer casing of the devolatilizer being then contiguous with the screws or rollers. But in this case the volatile products can no longer expand and the devolatilization is carried out under poor conditions owing to the absence of the decompression chamber.

The object of the invention is to provide an apparatus for eliminating the volatile constituents from a composition which almost completely avoids the risk of pollution of the composition while allowing an efficient devolatilization of the constituents to be eliminated.

This apparatus is of the type comprising an elongated enclosure which is provided with a devolatilization chamber and in which are rotatably mounted cylinders having parallel axes, the number of said cylinders being at least three and each of said cylinders being tangent to two other two cylinders, an operational clearance or gap being provided, said cylinders completely surrounding the devolatilization chamber, the longitudinal walls of the chamber being constituted by that part of the lateral surface of each cylinder which is located between the two generatrices on which the cylinder is tangent to the other two cylinders and faces the axis of the enclosure.

In order to allow the full expansion in the devolatilization chamber of the composition subjected to the treatment, the inner wall of the enclosure surrounds the remainder of the lateral surface of each cylinder.

In this way the material, in arriving in the devolatilizer, is taken up by the cylinder and distributed in thin layers along the moving walls. It is thereafter brought to the centre space or devolatilization chamber which is under a vacuum and of such volume as to allow a good inflation of the material and ensure a good liberation of its volatile elements by the bursting of the layer of this material. It is thereafter subjected to an identical cycle which once more projects it in the form of thin layers towards the moving walls and then returns it to the centre space.

With this arrangement, all the walls of the devolatilization chamber are moving and are renewed constantly in the course of the rotation of the cylinders.

All the deposits or projections which come in contact with these moving walls are immediately reincorporated in the mass being treated and can therefore have no tendency to tar or carbonize.

The mass to be treated comes in contact with the cylinders by way of passages communicating with one end of the enclosure and issues therefrom axially at the other end by way of a gap between each cylinder and the inner wall of the enclosure surrounding the cylinder.

The volatile products are discharged in a longitudinal direction at the end of the enclosure, where the treated mass is discharged, and not in a transverse direction as in known apparatuses. The vacuum can be produced by way of the discharge passage for the volatile products so as to promote their devolatilization.

The cylinders can be smooth, screwthreaded, fluted or grooved. When they are smooth, they merely ensure that he material moves in thin layers. In the other cases they interlock or mesh, the tangency of the cylinders being on the pitch diameters, a certain operational clearance or gap being however provided which determines the thickness of the layer of the product being treated. In this case they produce an additional shearing of the product and increase the area of treatment of the latter without increasing the size of the apparatus. It will be clear that the bigger the required volume of the devolatilization chamber, the greater the required number and/or diameter of the cylinders.

The outer casing of the apparatus can have a double wall so as to allow circulation of a heat-exchange fluid, this bringing the material to the operating temperature and also discharging the heat generated by the rubbing and mixing of the material.

The cylinders are advantageously hollow so as also to allow the same circulation of a heat-exchange fluid and facilitate bringing the products to be treated to the required temperature.

Such an apparatus permits the elimination of very high contents of volatile products, on the order of 50% and more, without resulting in a pollution of the treated product. In this way it is possible to obtain substantially colourless thermoplastic polymers.

It must be remembered from the foregoing description that it is necessary for the devolatilization chamber to have such volume as to allow a high expansion of the treated product. This chamber can be constructed from three cylinders but it will be understood that in this case the diameter of the cylinders must be large enough to result in a volatilization chamber having such volume as to enable the material to be treated effectively.

This is why, from a technological point of view, it is preferable to employ four cylinders or a higher number thereof, which will permit the utilization, for a given total overall volume, of a devolatilization chamber having a much greater useful volume.

The diameter of the cylinders intervenes in the definition of the devolatilization chamber. It does not intervene in the treatment of the product since this apparatus does not have a slubbing or mixing function. The cylinders have a constant pitch and section, so that there is no compression and mixing zone resulting from the screw pitch or the profile of the screwthread as in a slubbing device. In the apparatus according to the invention, in the case of unsmooth cylinders, there is at the very most a shearing effect on the material, which must not be confused with a mixing effect, and also a product conveying effect so that the product travels rapidly through the apparatus.

The apparatus according to the invention is therefore clearly distinguished from the conventional multi-screw gas-removing slubbing devices, with a vacuum connection in the operating chamber transversely of the axis of the travel of the material in the apparatus, which serve to extract only the few percents or traces of volatile materials contained in this product. The various designs of these slubbing devices do not result in the formation of a single centre space between the screws which has such volume as to result in the necessary expansion of the product for completely liberating the volatile materials therefrom.

Further features and advantages of the invention will be apparent from the ensuing description with reference to the accompanying drawing.

In the drawing:

FIG. 1 is a cross-sectional view of one embodiment of the invention taken along line 1—1 of FIG. 2.

FIG. 2 is a longitudinal sectional view, taken along line 2—2 of FIG. 1.

Figure 3:
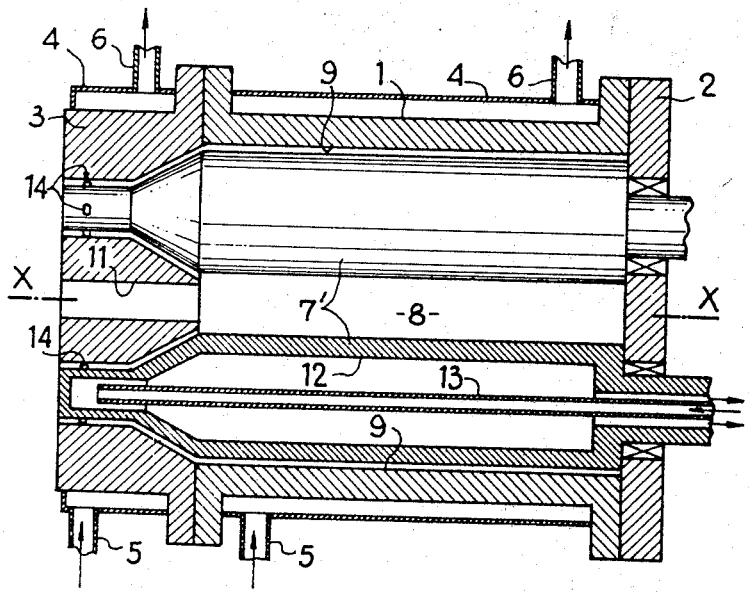
FIG. 3 is a similar view illustrating a modification.

In the illustrated embodiment, the apparatus comprises a cylindrical enclosure 1 which is closed at both ends by end walls 2 and 3 secured to the enclosure 1 by bolts or other means. The enclosure 1 and the wall 3 corresponding to the outlet end of the apparatus are surrounded by a casing 4 which permits a circulation of a heat exchange fluid supplied by passages 5 and discharged by way of passages 6. Mounted inside the enclosure 1 are four screwthreaded cylinders 7 whose axes are parallel to each other and to the axis X—X of the enclosure 1. The cylinders are journalled in the walls 2 and 3 and can be driven in rotation outside the wall 2 by any suitable means (not shown).

In the modification shown in FIGURE 3 the cylinders 7' are smooth faced.

The cylinders interengage and are so disposed that each is tangent on its pitch diameter to two other cylinders. The generatrices corresponding to this tangency are represented by the points A, B, C and D shown in FIG. 1. The curvilinear quadrilateral ABCD constitutes the section of the devolatilization chamber 8 of the apparatus in a transverse plane of the latter.

Thus it is clear that the chamber 8 is completely enclosed by the cylinders 7, its longitudinally extending lateral walls being formed by that portion of the lateral surface of each cylinder which is located between the tangency generatrices and faces the axis X—X. The remainder of the lateral surface of each cylinder 7 is surrounded by the inner wall 9 of the enclosure 1 so that the chamber 8 is the sole volume in which can be produced a decompression and a volatilization of the volatile constituents of the treated mass.

The mass is introduced by way of passages 10 which extend transversely into the enclosure 1 at one end of the latter and open onto the centre space on the generatrices corresponding to the points B and D.

The mass issues from the enclosure by way of the space formed in the wall 3 between the part of each cylinder of reduced section forming a journal, and the cavity for this journal.

The volatile products are discharged by way of an axial bore 11 which is formed in the wall 3 in the extension of the chamber 8 and can be connected to a source of vacuum.

It will be observed that this bore is surrounded by the apertures for discharging the material from which the volatile products have been removed.

The cylinders 7 are advantageously hollow, as shown, a heat regulating fluid flowing through their inner cavity 12. This fluid is supplied by way of an axial tube 13 and is discharged by way of the space formed between this tube and the inner wall of the part of reduced section of the cylinders 7 journalled in the wall 2.

The apparatus operates in the following manner:

The material to be treated is supplied to the enclosure 1 by way of the passages 10, is taken up by the cylinders 7 and distributed along the moving walls of the latter in an even manner in thin layers. The material travels in the gaps between these cylinders and the inner wall 9 and is constantly returned to the centre space 8 where it swells and is freed of its volatile elements. The material is thereafter taken up and once more projected towards the moving walls in the form of thin layers. The space 8 therefore performs its function of a devolatilization chamber perfectly well and avoids the danger of deposits of material on the walls of this chamber which are constantly renewed. The volatile products, the liberation of which is greatly facilitated by putting the product in the form of thin layers, are finally discharged by way of the passage 11 which is advantageously connected to a source of vacuum. The heat-exchange circuits 5, 6 and 13 permit maintaining inside the apparatus the most favorable temperature for the devolatilization either by means of a supply of heat serving to heat the composition or by the elimination of the heat which might result from putting the product in the form of thin layers. The material from which the volatile products have been removed and which travels through the apparatus under the combined effect of the continuous feed and the screwthreading of the cylinders 7, is finally extruded through the wall 3. It is uncoloured by the residues of carbonization of the volatile products as is often the case when using previously-known devolatilizing apparatuses. It is thus possible to obtain by means of the apparatus of the invention practically colourless thermoplastic polymers even from polymerization mixtures containing a high proportion of monomers which had not reacted.

Although a specific embodiment of the invention has been described, many modifications and changes may be made therein without departing from the scope of the invention as defined in the appended claims.

Thus, though it might be convenient and advantageous to arrange that all the cylinders have the same diameter as shown, this is not indispensable, particularly in the case of smooth cylinders.

Having now described my invention what I claim as new and desire to secure by Letters Patent is:

1. An apparatus for eliminating volatile constituents from a composition, in particular from a polymerization mixture, whereby it is possible to eliminate very high contents of these constituents without risk of pollution of the composition, said apparatus comprising an elongated enclosure having an axis, cylinders having axes parallel to said axis and rotatably mounted in said enclosure around said axis, the number of said cylinders being at least three and said cylinders having outer surfaces within said enclosure which define with each other substantially identical narrow first gaps, a devolatilization chamber defined by moving lateral walls consisting of those parts of said cylinder surfaces between said first gaps which are adjacent said axis, said enclosure extending around said axis in an uninterrupted manner and comprising as many substantially part-cylindrical recesses as there are cylinders, said recesses being respectively coaxial with said cylinders and respectively defining with said surfaces narrow second gaps which respectively extend circumferentially of said cylinders substantially to said first gaps, composition feeding passage means communicating with said cylinders, narrow composition discharge passage means communicating with said cylinders, and passage means communicating with said devolatilization chamber for discharging said volatile constituents, said devolatilization chamber having such volume as to allow said composition to inflate and thus liberate said volatile constituents and said gaps having such size as to allow said composition to travel through said gaps substantially without allowing said composition to inflate and liberate said constituents in said gaps.

2. An apparatus as claimed in claim 1, wherein said surfaces of the cylinders are smooth.

3. An apparatus as claimed in claim 1, wherein said surfaces of the cylinders have interengaging helical grooves and projections, the pitch of the helix being constant, and all the cylinders being tangent to adjoining cylinders on the pitch diameters of the cylinders.

4. An apparatus as claimed in claim 1, wherein said volatile constituent discharging passage means consists of a passageway extending longitudinally through one end of said enclosure and communicating directly with said chamber.

5. An apparatus as claimed in claim 4, wherein said passageway is axially disposed in said enclosure and said composition discharge passage means comprise apertures for extruding the composition from which the volatile products have been removed, said extrusion apertures being coaxial with the cylinders and located at the same end of said enclosure as said passageway for discharging said volatile constituents.

References Cited

UNITED STATES PATENTS

| 2,458,068 | 1/1949 | Fuller | 159—2 X |
| 2,508,495 | 5/1950 | Consalvo | 18—12 |

FOREIGN PATENTS

| 2,045 | 1/1906 | Great Britain. |
| 1,029,295 | 5/1966 | Great Britain. |

REUBEN FRIEDMAN, *Primary Examiner.*

R. W. BURKS, *Assistant Examiner.*

U.S. Cl. X.R.

159—2; 165—87